(12) United States Patent
Smolyaninov et al.

(10) Patent No.: US 9,069,076 B1
(45) Date of Patent: Jun. 30, 2015

(54) POLARITONIC META-MATERIAL COMBAT IDENTIFICATION

(75) Inventors: Igor I. Smolyaninov, Columbia, MD (US); Idan Mandelbaum, Columbia, MD (US); Louise C. Sengupta, Ellicott City, MD (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 214 days.

(21) Appl. No.: 13/596,494

(22) Filed: Aug. 28, 2012

(51) Int. Cl.
  *G01S 13/78* (2006.01)
  *G01S 17/74* (2006.01)

(52) U.S. Cl.
  CPC ..................................... *G01S 17/74* (2013.01)

(58) Field of Classification Search
  CPC ............... G06K 2017/0045; G06K 19/07749; G06K 19/07758; G06K 19/0723; G01S 17/74; F41A 17/08

USPC ................... 340/573.1, 573.4, 572.1, 539.11, 340/539.13, 10.1, 10.4; 398/151, 168, 169; 342/45, 54, 90
See application file for complete search history.

(56) References Cited

U.S. PATENT DOCUMENTS

| | | | |
|---|---|---|---|
| 2003/0147651 A1 | 8/2003 | Roes et al. | |
| 2007/0236384 A1* | 10/2007 | Ivtsenkov et al. | 342/45 |
| 2008/0136641 A1* | 6/2008 | Kean | 340/572.1 |
| 2009/0045996 A1* | 2/2009 | Ivtsenkov et al. | 342/45 |
| 2011/0063102 A1* | 3/2011 | Ivtsenkov et al. | 340/505 |
| 2013/0015977 A1* | 1/2013 | Scott | 340/600 |

* cited by examiner

*Primary Examiner* — Thomas Mullen
(74) *Attorney, Agent, or Firm* — Daniel J. Long

(57) ABSTRACT

An identification apparatus, capable of distinguishing between a first class of objects and a second class of objects. This identification apparatus includes an identification tag, which is capable of providing a certain reflection band and a certain thermal emission band. The identification apparatus also includes a thermal weapon sight which has a long-wave infrared band-pass filter. This band-pass filter passes through a desired range of wavelengths and filters out an undesired range of wavelengths. The reflection band and the thermal emission band are detectable within the desired range of wavelengths.

19 Claims, 3 Drawing Sheets

POLARITONIC META-MATERIAL COMBAT IDENTIFICATION

FIELD OF THE INVENTION

The present invention relates to Thermal Weapon Sights (TWS) intended to give soldiers a tremendous day and night advantage to detect, observe, and engage the enemy in modern battlefields. More particularly, the present invention provides a surface with directional emissive or reflective response capabilities in the long-wave infrared (LWIR) spectral range to provide friend identification.

BRIEF DESCRIPTION OF PRIOR DEVELOPMENTS

The need to protect against fratricide (friendly fire) remains a challenge for both U.S. and Coalition forces fighting across a wide spectrum of conflict. The current fielded solution to combat identification may accord our enemies some of the same benefits of clear target marking as it does to U.S. and Coalition Forces. These conventional approaches for combat identification depend on non-discriminating optical cues such as infrared marking tape or panels that provide the enemy the same benefits of U.S. identification that they provide to friendly forces.

One such conventional approach is known as the Joint Combat Identification Marking Systems (JCIMS). While Joint Combat identification marking Systems (JCIMS) is inexpensive, the threat of exploitation can only be overcome by powering off the system, thereby denying its benefit to U.S. forces as well.

A need, therefore exists, for a light-weight, powerful, and effective identification system that distinguishes between friendly and enemy forces. The present invention is made based on knowledge gained from the recent discovery that the electromagnetic thermal response of a source made of a polar material that supports Surface Phonon-polariton (SPP) propagation is directional, wavelength-selective, and is partially coherent. These characteristics apply both to reflection and thermal emission. This effect can be used in a novel combat ID tag (low cost), has a low probability of intercept, and is secure to due to its directionality and narrow spectral bandwidth of the response.

SUMMARY OF THE INVENTION

Soldiers need combat identification capabilities that are lightweight and effective. The present invention satisfies this need by leveraging new advances in meta-materials to provide existing personnel and crew using TWS clear indications that a friendly solider or vehicle is in their field of view.

Several tags are attached to a warfighter's uniform (front and back). These tags consist of a silicon substrate layer, a thin $SiO_2$ layer ruled with a grating, and a Teflon sheet. The tag is flexible, thereby enabling multiple angle viewing and adherence to body contours.

Another warfighter, equipped with a TWS having a band-pass filter, is able to identify at close range (100 to 300 m) the friendly soldier via the tag while an enemy is denied access since their night vision does not include a filter. The filter is external and is mounted in front of the TWS, but does not introduce limitations on the field of view for the TWS user. Such LWIR band-pass filters can be based on reflecting volume Bragg gratings in a bulk of photosensitive LWIR-transparent glass such as chalcogenide glass. When the TWS user is no longer able to see the tag in the passive mode, he can switch to active mode by activating the tag via his laser designator, which is detected by the tag's simple photodetector. In turn, pulsed power is supplied to the tag to create a change in temperature that then causes the tag to thermally emit. No external power supply is necessary.

This approach gives a warfighter the capability to determine friendly forces at distances up to 300 m with a 4-inch precision. At longer distances this lateral precision is reduced. However, the presence of multiple tags mounted on a friendly warfighter will allow friend recognition up to the 600 m targeting range of the M-4 rifle. Directionality of thermal response provided by the tags add an additional layer of physical security.

BRIEF DESCRIPTION OF THE DRAWINGS

The present invention is further described with reference to the accompanying drawings wherein.

DETAILED DESCRIPTION OF THE PREFERRED EMBODIMENT

Tag Composition

Figure 1:
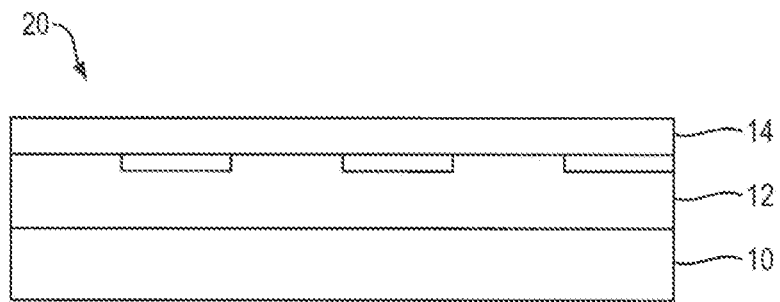
FIG. 1 is a side view of the CID tag of the present invention.

In the present invention, the polaritonic meta-material combat identification (CID) tag may act as a directional notch reflector, a directional emitter, or both. The tag structure is capable of converting thermal energy into highly directional thermal radiation. As seen in FIG. 1, the first (bottom) layer of the tag 20 is a Si substrate wafer layer 10, which provides for convenient fabrication of the polaritonic $SiO_2$ grated layer 12. The fabrication process starts from standard 4-inch silicon wafers. The silicon wafer layer 10 will be surface-oxidized, so that the polaritonic layer 12, which supports surface phonon-polaritons, can be formed. In one embodiment, the polaritonic layer 12 is 2-3 µm thick. The produced polaritonic layer 12 is stable enough to be cleaned yet capable of withstanding multiple cycles of polymer grating removal and deposition. A low-pressure chemical vapor deposition (LPCVD) technique is used to grow $SiO_2$ film. The polaritonic layer 12 is then patterned with photoresist, followed by dry etch to form the grating structure.

In order to make the tag 20 flexible and thus able to conform to a warfighter's uniform, the silicon wafer layer 10 must be reduced from its standard thickness of 550 µm to 100 µm. Thinning of the silicon wafer layer 10 can be done by either a mechanical process such as grinding, or by a chemical process such as wet etch. The thinned CID tag is then glued to a cloth by an environmentally stable adhesive.

The surface grating of the polaritonic layer 12 used in the tag 20 is a combination of various overlapping gratings that shape the tag's radiation pattern and emission wavelength in selected narrow bands inside the LWIR 8-12 µm range (the typical wavelength range of TWS). On top of the polaritonic layer 12 is a polymer sheet layer 14 such as Teflon (polytetrafluoroethylene). However, other suitable polymer materials besides Teflon may be used (the choice is made depending on the position of the tag bandwidth in the 7.5 μm to 14 μm range). For instance, Teflon has a suitable transmission window around 9.2 μm and absorptive in most of the remainder of the 7.5-14 μm range. The polymer layer 14 is necessary to reduce the tag reflectivity outside of the operating bandwidth of the tag in the remainder of the 8-12 μm range, wherein the tag operates as a broad-band absorber. This polymer layer 14 is necessary to eliminate the probability of tag detection by enemy forces by reducing the overall apparent tag reflectivity for a TWS even without a filter. Additionally, the polymer layer 14 protects the microfabricated structures from being scratched. The polymer layer 14 can be printed with patterns similar to Army Combat Utility (ACU) patterns or Marine Corps Digital Patterns to further disguise its presence and function.

Four of the 4-inch tags are attached to a warfighter uniform (two on the front of the warfighter and two on the back). Therefore, all supporting calculations are performed on the basis of two 4-inch tags in the field of view of the TWS.

Figure 2A:
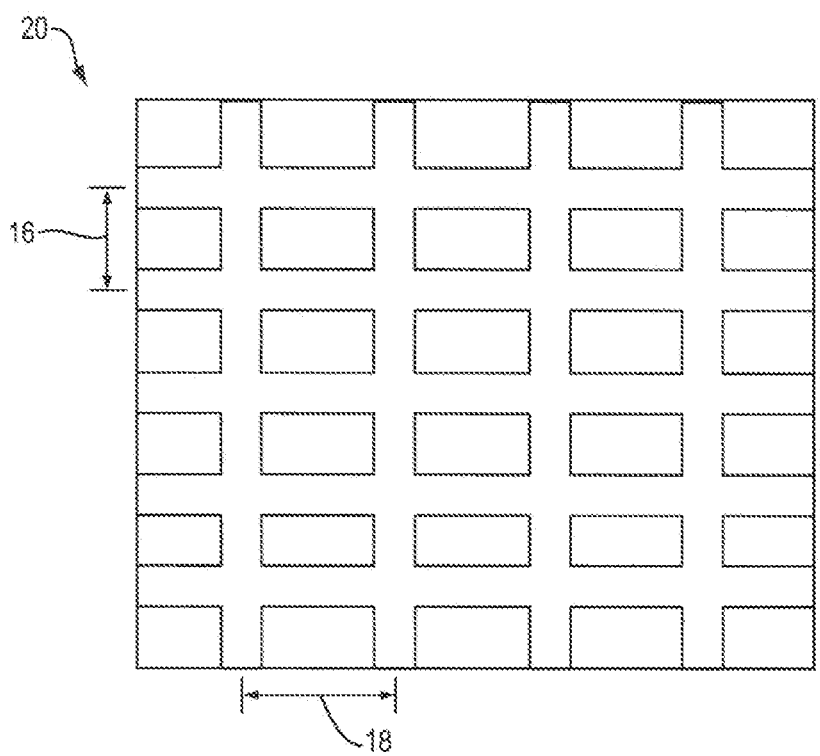
FIGS. 2a and 2b are top and side views, respectively, of the grating of the polaritonic layer.
Figure 2B:
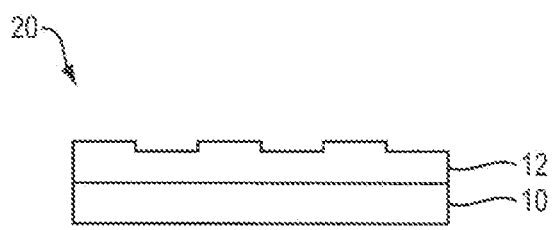
Figure 3:
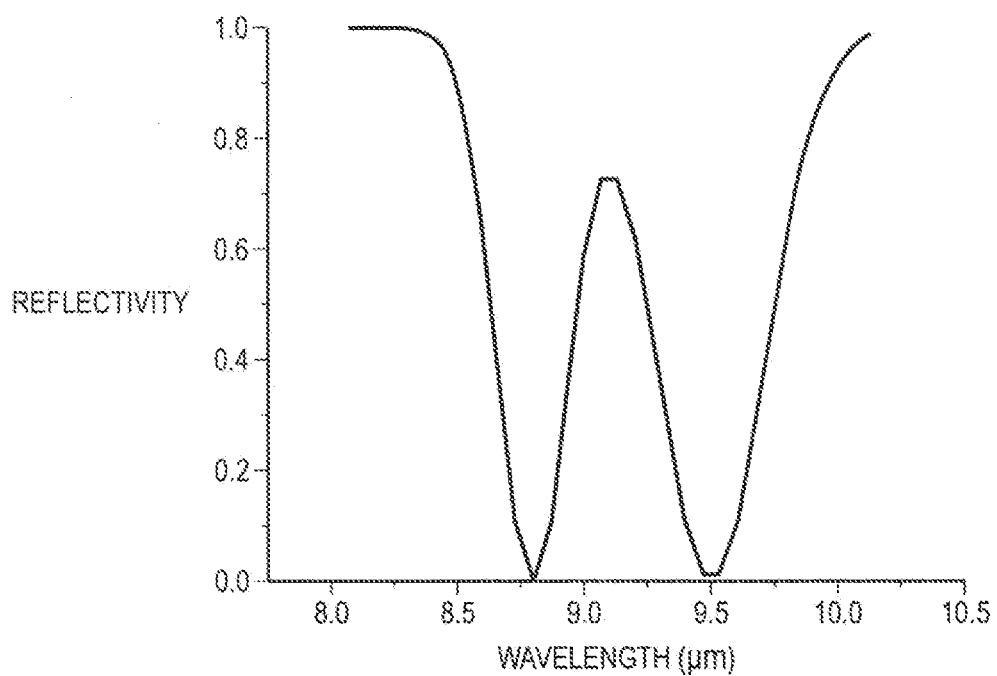
FIG. 3 displays the reflectivity of the CID tag of the present invention at various wavelengths.

$SiO_2$ is highly reflective in the 8.2 μm to 10 μm range due to the presence of reststrahlen bands. $SiO_2$ is inexpensive, and, as stated previously, supports surface waves (surface phonon polaritons) in the wavelength range that is typical for TWS. Regarding the grating of the polaritonic layer 12, a sharp reflection notch is obtained as a spectral gap between two emission notches. FIGS. 2A and 2B depict the grating of the polaritonic layer 12. In one embodiment, surface gratings providing two narrow emissive notches at distance 16 of 8.6 μm and distance 18 of 9.5 μm and create a coupling between external light and polaritons, thereby strongly suppressing reflectivity. Thus, a favorable reflective notch, which is around 9.1 μm, is formed. FIG. 3 illustrates this relationship as reflectivity is high at a wavelength of 9.1 μm, while nearly zero at 8.6 μm and 9.5 μm. The spectral region outside of the emission notches is blocked by absorption of the polymer layer 14. The central reflection notch at 9.1 μm is used in the passive and active modes of the tag operation, discussed below.

The electromagnetic field emitted by a thermal source made of a polar material that supports surface phonon-polariton propagation is directional, wavelength-selective, and partially coherent. Thus, the thermal radiation is monochromatic and is highly directional. These findings are used to create a CID tag that will work in the LWIR spectral range. Compared to prototypes based on infrared silicon photonic crystals, the polaritonic metamaterials system provides a much brighter response due to the higher phonon polariton density of states in the LWIR thermal emission band when compared to the photonic density of states in the prototype photonic crystal geometry.

Passive Mode

Figure 4:
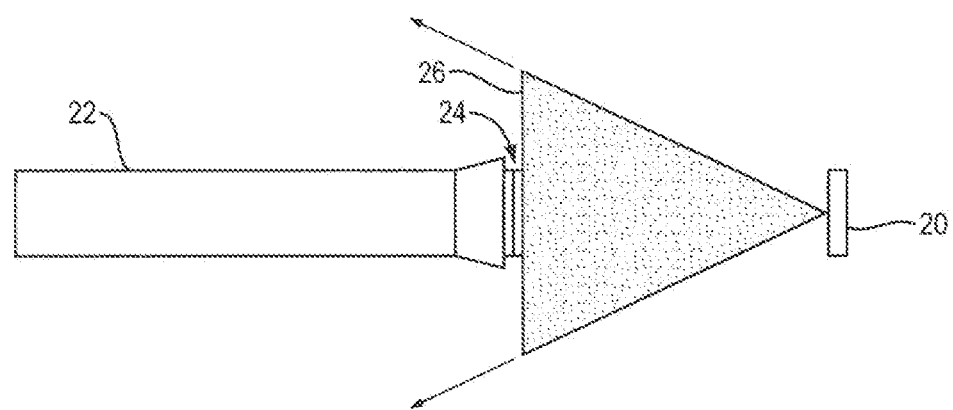
FIG. 4 illustrates the passive mode operation of the present invention.

The tag of this invention may operate in two modes depending on the targeting range. In the first, "passive" mode, the tag relies on a reflecting spectral notch written into the tag 20 as shown in FIG. 4. The tag 20 is read using a TWS 22 with a notch filter 24. Since the narrow wavelength of the response of the tag-filter combination is not known to the enemy, the tag 20 is secure. It is not visible to a TWS 22 operating without the notch filter 24. The frequency of the notch in the 8-12 μm LWIR window may be changed as desired by providing a warfighter with another CID/filter combination.

A clear night sky has visual temperature about 50° K below the ambient background. Therefore, an ideal reflector mounted on a soldier is highly visible up to the maximum range of TWS with its noise equivalent temperature of 22° mK. On the other hand, such a reflector would be equally visible to enemy forces equipped with a similar TWS. Using a passive narrow band notch reflector in conjunction with the TWS produces an effective CID tag. If, for example, the friendly forces are equipped with the correct notch transmission filters, which can be mounted on their TWS, they will be able to detect the reflective notch tag. Conversely, enemy forces, which do not have the correct notch filter would not see the tag response, which is averaged and integrated over the whole 8-13 μm spectral range of the TWS. Therefore, a passive reflective notch tag will be undetectable to enemy forces.

Based on the known phonon-polariton spectra of SiO2, the wavelength selectivity and spatial directionality of the CID tag structure can be predicted precisely. Since the expected beam divergence of the thermal source is about 0.1 radian, the thermal power intercepted by the thermal sight can be calculated depending on the range of the tag area.

Active Mode

Figure 5:
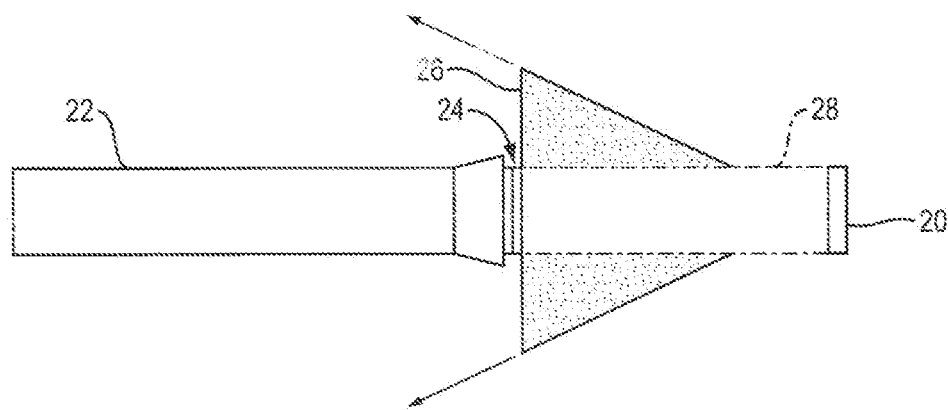
FIG. 5 illustrates the active mode operation of the present invention.

In addition, the range of the passive tag may be extended by operating in the "active mode" as depicted in FIG. 5. In this mode the tag 20 emits directional thermal emission within the same narrowband spectral band in response to an illuminating beam 28. In one embodiment, illuminating beam 28 is an 830 nm illuminating beam. Since the tag 20 is activated only in response to this sort of laser, overall power consumption of the tag 20 in the active mode is very low. The security of the tag 20 is assured as it is activated only in response to the interrogation beam 28. Additionally, without knowing the detection band, the tag 20 cannot be read by enemy forces using a TWS 22 without a filter, as the average tag response over the TWS sensitivity range remains unchanged during interrogation. That is, without knowing the detection band, the tag cannot be read by enemy forces using TWS without a filter. The range for operating in the active mode is roughly three times that of operating in the passive range.

Figure 6:
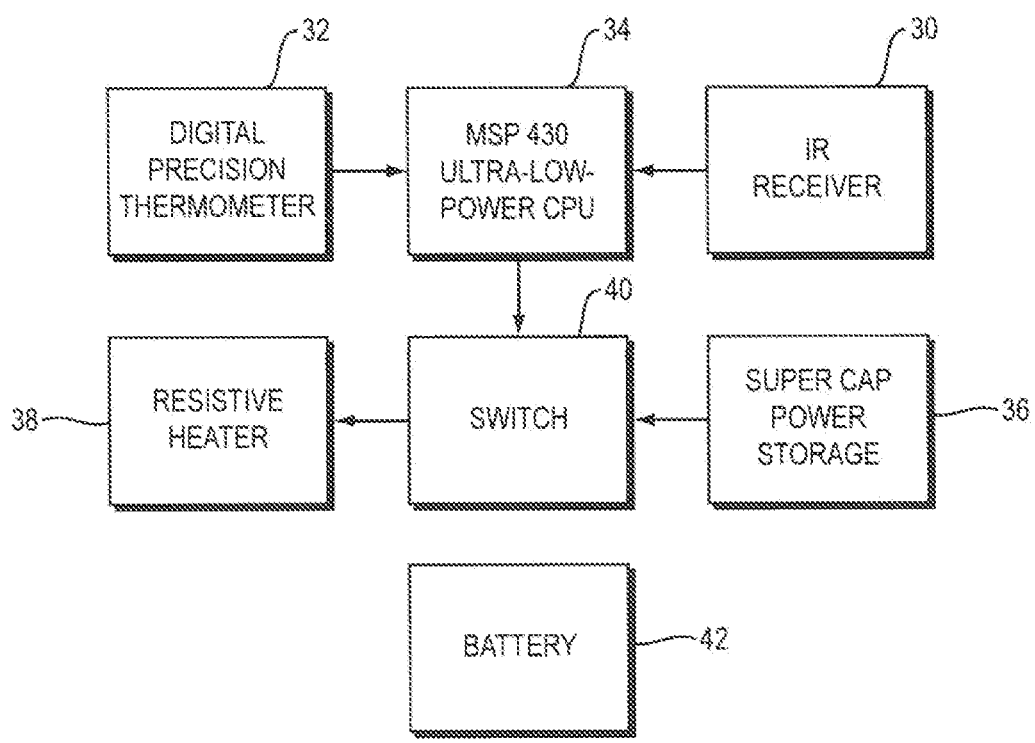
FIG. 6 is a block diagram of the battery-powered electrical subsystem used to receive an IR signal and adjust temperature if needed.

A carbon-based system will be implemented for heating the tag in the active mode. A simple approach consists of spraying carbon paint onto the back of the silicon wafer. The tag can then be attached to the fabric using all-purpose glue. Carbon fiber fabrics may also be used. A conductive epoxy may be used to maintain good thermal conductivity between the silicon substrate and the fabric. The carbon fiber fabric could be used either in addition to the carbon paint or as a substitute. The electrical subsystem of FIG. 6 is used to receive interrogation signals at an IR receiver 30 and raise the temperature of the CID tag by the required ΔT<10° C. The carbon-based powder adhesive will be used on the back of the tag as a resistive heating mechanism. To raise the temperature, a supercapacitor 36 will discharge the appropriate energy into the carbon powder-based resistor to dissipate the energy of roughly $\frac{1}{2}CV^2$. This will attain approximately the required temperature. The temperature of the tag will be monitored through a precision digital thermometer 32 and sent to an ultra-low-power microprocessor 34, such as the MSP430 from Texas Instruments, for interpretation. Once the capacitor 36 is discharged into the heating resistor 38, the temperature will be compared to the desired temperature, and if further heating is necessary the switch 40 will remain on and the battery power 42 will be used. The capacitor 36 will be calculated such that most of the required heating is done by the capacitor 36 and the battery 42 will just be used to supply a small remaining power to reach the desired temperature:

½CV²=mcΔT. An off-the-shelf IR detector like those used in TV remote controls will be used to trigger the heating process and will be interfaced to the microprocessor. As stated previously, the MSP430 microprocessor 34 development kit from Texas Instruments may be used as the base platform for development.

For the production demonstration phase, a laser diode system will be used for the triggering. As stated previously, an 830 nm laser illumination will be read by the laser diode system and the microprocessor will then interpret the signal to decide whether it meets the criteria for triggering the tag. In this phase, a customer printed circuit board (PCB) will be designed and provide form-fit prototypes. These PCBs will be mounted on the back of the tags.

Those skilled in the art will appreciate that this invention may also be used for other commercial, non-military applications to identify different classes of objects. For example, these classes of objects for identification may be, but not limited to, livestock in a group or other classes of people such as during night-time rescue missions.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

What is claimed is:

1. An identification apparatus, capable of distinguishing between a first class of objects and a second class of objects, said identification apparatus comprising:
   an identification tag, said tag being capable of emitting a desired reflection band signal and a desired thermal emission band signal upon receiving an interrogation beam, wherein a respective said identification tag is attached to each object of said first class of objects and is not attached to objects of said second class of objects; and
   a thermal weapon sight for sending the interrogation beam, said thermal weapon sight having a long-wave infrared band-pass filter, wherein said band-pass filter passing a desired range of wavelengths and filtering out an undesired range of wavelengths, wherein said desired reflection band signal and said desired thermal emission band signal emitted by the identification tag attached to said first class of objects are within the desired range of wavelengths and passed by said band-pass filter, thereby distinguishing between the objects of the first class of objects and the objects of the second class of objects.

2. The apparatus of claim 1 wherein said first class of objects are soldiers.

3. The apparatus of claim 1 wherein said tag further comprises a substrate, a polaritonic layer formed on said substrate, and a polymer layer formed on said polaritonic layer.

4. The apparatus of claim 3 wherein said substrate is silicon.

5. The apparatus of claim 3 wherein said polaritonic layer is silicon dioxide.

6. The apparatus of claim 3 wherein said polymer layer is composed of polytetrafluoroethylene.

7. The apparatus of claim 3 wherein said polaritonic layer comprises gratings, said gratings shaping said tag's radiation pattern and emission wavelength.

8. The apparatus of claim 7 wherein said tag operates in the long-wave infrared spectral range from approximately 8 µm to approximately 12 µm.

9. The apparatus of claim 8 wherein said gratings are shaped by at least one emission notch and a sharp reflection notch.

10. The apparatus of claim 9, wherein one said emission notch is set at 8.6 µm, another said emission notch is set at 9.5 µm, and said sharp reflection notch is set at 9.1 µm.

11. A method of detecting an object via thermal emission, said method comprising:
   applying a resistive heating mechanism to the object;
   sending an interrogation beam by a thermal weapon sight;
   upon receiving the interrogating beam;
   discharging a capacitor into said resistive heating mechanism to heat said object to a desired temperature at a low level of precision;
   comparing the temperature of said object as a result of said discharging to said desired temperature;
   supplying battery power, if the temperature of said object as a result of said discharging is lower than said desired temperature to heat said object to said desired temperature at a high level of precision; and
   detecting the object by the thermal weapon sight by detecting a thermal emission from the object when the temperature of said object is equal to the desired temperature.

12. The method of claim 11 wherein said resistive heating mechanism is a carbon powder based adhesive.

13. The method of claim 11 further comprising monitoring said temperature with a precision digital thermometer.

14. The method of claim 13 wherein said precision digital thermometer sends said monitored temperature to an ultra-low-power microprocessor.

15. A method of detecting an object, said method comprising:
   marking the object with an identification tag, said tag comprising a silicon substrate, a polaritonic layer formed on said silicon substrate, and a polymer layer formed on said polaritonic layer;
   sending an interrogation beam from a thermal weapon sight to the identification tag;
   thermally emitting a designated infrared band signal from said tag via reflection of the interrogation beam upon receiving the interrogation beam, wherein said designated infrared band signal is within a spectral range from approximately 8 µm to approximately 12 µm;
   filtering incoming infrared light through a band-pass filter of the thermal weapon sight, said band-pass filter passing a desired range of wavelengths which includes the spectral range and filtering out an undesired range or wavelengths;
   identifying said object upon receiving the designated infrared band signal which is passed by the band-pass filter, thereby detecting the object; and
   displaying said object on the thermal weapon sight.

16. The method of claim 15 wherein said polaritonic layer is silicon dioxide.

17. The method of claim 15 wherein said polymer layer is polytetrafluoroethylene.

18. The method of claim 15 wherein said polaritonic layer comprises gratings, said gratings shaping said tag's radiation pattern and emission wavelength.

19. The method of claim 18 wherein said gratings are shaped by at least one emission notch and a sharp reflection notch.

* * * * *